(12) United States Patent
Hilliard et al.

(10) Patent No.: US 6,392,657 B1
(45) Date of Patent: May 21, 2002

(54) METHOD AND APPARATUS FOR CHARACTERIZING AN OPTIMAL VIEWING ANGLE OF FLAT DISPLAY

(75) Inventors: William J. Hilliard, San Francisco, CA (US); Jean-Pierre Huber, Neydens (FR)

(73) Assignee: E-Color, Inc., San Francisco, CA (US)

( * ) Notice: Subject to any disclaimer, the term of this patent is extended or adjusted under 35 U.S.C. 154(b) by 0 days.

(21) Appl. No.: 09/440,017

(22) Filed: Nov. 12, 1999

Related U.S. Application Data
(60) Provisional application No. 60/108,231, filed on Nov. 13, 1998.

(51) Int. Cl.$^7$ .............................. G09G 5/00; G06T 11/00
(52) U.S. Cl. ....................................... 345/589; 348/189
(58) Field of Search .................................. 345/904, 634, 345/158, 810–865, 147, 589; 348/180, 189, 190, 191, 198, 702, 701; 367/10; 349/1

(56) References Cited

U.S. PATENT DOCUMENTS

| | | | | |
|---|---|---|---|---|
| 4,897,721 A | * | 1/1990 | Young et al. | 358/139 |
| 5,345,362 A | * | 9/1994 | Winkler | 361/681 |
| 5,926,617 A | * | 7/1999 | Ohara et al. | 395/109 |

OTHER PUBLICATIONS

Toshiba, Satellite Pro user's guide, 1996, Toshiba, pp. 29 and chapter 3.*

* cited by examiner

*Primary Examiner*—Jeffery Brier
*Assistant Examiner*—Scott Wallace
(74) *Attorney, Agent, or Firm*—Irell & Manella, LLP

(57) ABSTRACT

A method for determining the optimal viewing angle of display, input, or output devices with limited viewing, output and/or sensing angle characteristics including a test pattern displayed on a display screen. Test pattern is displayed on display screen and includes one or more test elements having levels of gray different from the gray shown in background. Once initiated, viewer evaluates test pattern to determine if display screen is positioned at an optical viewing angle to the viewer. In particular, one set of test elements has a luminance just below background and the other set of test elements has a luminance just above background. To determine the optimal viewing angle, a viewer evaluates test pattern determine the difference in gray levels between test elements against background. The viewer then adjusts the position of display screen until test elements either blend in with background or provide the largest contrast with background. Where a very low luminance or a very high luminance background is utilized, the optimal viewing angle is determined by adjusting display screen until test elements blend in with the background i.e., have the same luminance as the gray shading in background. Where a medium luminance background is utilized, the optimal viewing angle is determined when test elements appear to provide the largest contrast against background i.e., have a luminance maximally different from the gray shading in the background.

30 Claims, 4 Drawing Sheets

METHOD AND APPARATUS FOR CHARACTERIZING AN OPTIMAL VIEWING ANGLE OF FLAT DISPLAY

RELATED APPLICATIONS

This application claims priority of provisional application Ser. No. 60/108,231, filed Nov. 13, 1998.

BACKGROUND OF THE INVENTION

1. Field of the Invention

This invention relates generally to color imaging technology and more particularly to a method for determining the optimal viewing angle of a display, such as a flat panel display. The same technique has applications for all display, input, or output technologies with limited viewing, output and/or sensing angle characteristics.

2. Description of the Prior Art

Various displays, such as flat panel displays, are based on technologies that are very different from CRT technology. For example, flat-panel LCDs for desktops use rod-shaped molecules that bend light to produce an image in contrast to CRTs that use electron guns that light up the phosphors on the viewing area of a glass tube. Flat panel LCDs do not have a CRT's geometric, convergence or focus problems, and their clarity makes it easier to view higher resolutions at smaller screen sizes. Also, the latest flat panel displays are all digital, unlike CRT's. This means that graphics cards with digital outputs do not have to convert the graphics information into analog form as they would with a typical monitor. Theoretically, this makes for more accurate color information and pixel placement.

Flat panel displays, however, suffer from viewing angle limitations. CRT's radiate light roughly into a full hemisphere, while flat panel devices radiate light over a smaller solid angle that is highly directional. Consequently, moving the head or tilting the display changes contrast, brightness and colors of the screen in a dramatic way. For example, some conventional flat panel displays have less than 100-degree viewing angles, making it difficult to gather viewers around the screen or even for a viewer to shift his or her head without losing the image. Although some of the latest flat panel displays have 140-degree viewing angles or more on 15-inch panels or 160 or greater degree viewing angles on larger 18-inch displays, it is still desirable to determine the optimal viewing angle of the display. The optimal viewing angle ensures optimal contrast and brightness and consistent color rendering, which are especially important for applications using pictures or graphics, such as presentations, desktop publishing, browser use and so forth.

Conventional methods for determining the optimal viewing angle are generally rudimentary. For example, common methods include tilting the display until the image looks "good" to a user or viewing the display at an angle normal (i.e. perpendicular) to the display. Such methods may suffice for low level applications dealing mostly with text and saturated colors. However, with respect to pictures, the above limitations, resulting in lost contrast and brightness, become obvious. As the panel is tilted away from the optimum viewing angle, shadows, mid-tones or highlights fail to show contrast and detail, and colors are altered.

What is needed therefore is an apparatus and method for determining the optimal viewing angle of a display, such as a flat panel display, thus ensuring optimal contrast and brightness and consistent color rendering.

SUMMARY OF THE INVENTION

The present invention provides, in a first aspect, an apparatus for determining a predetermined viewing angle of a display including a computer program having logic for generating a test pattern including at least one indicator and a background, wherein appearance of the indicator is different from appearance of the background and difference in appearance between the indicator and the background at various viewing angles indicates whether the predetermined viewing angle has been determined.

In another aspect, the present invention provides a method for determining a predetermined viewing angle of display, including the step of generating a test pattern including at least one indicator and a background such that appearance of the indicator is different from appearance of the background and difference in appearance between the indicator and the background at various viewing angles indicates whether the predetermined viewing angle has been determined.

These and other features and advantages of this invention will become further apparent from the detailed description and accompanying figures that follow. In the figures and description, numerals indicate the various features of the invention, like numerals referring to like features throughout both the drawing figures and the written description.

DETAILED DESCRIPTION OF THE PREFERRED EMBODIMENT(S)

Figure 1:
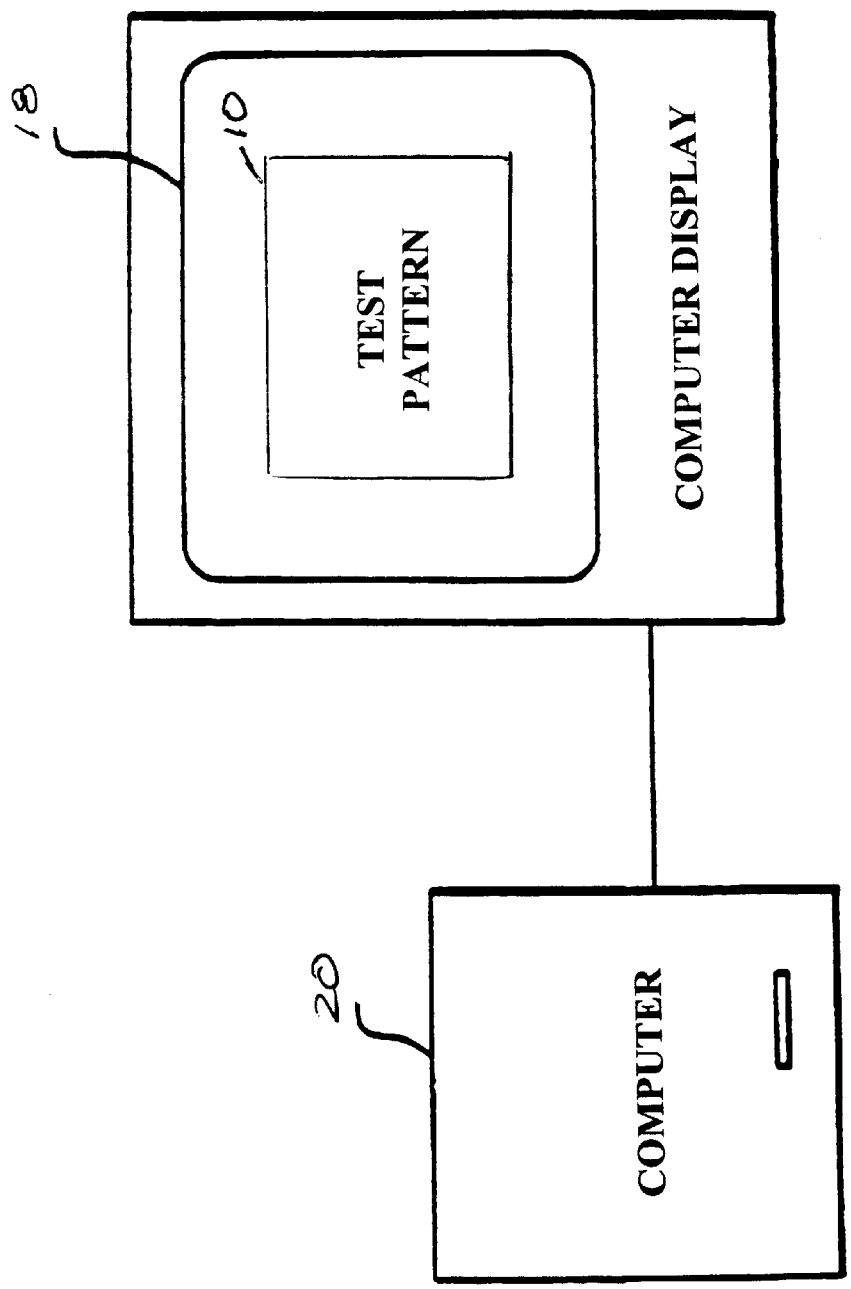
FIG. 1 is a block diagram of a computer and display including test pattern in accordance with the present invention.
Figure 2:
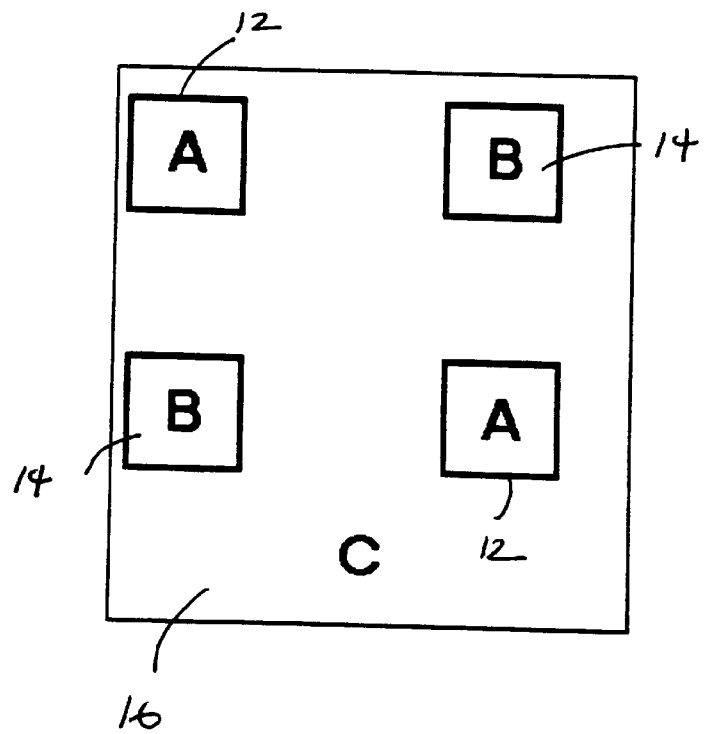
FIG. 2 is a detailed depiction of the test pattern for determining the optimal viewing angle of the display shown in FIG. 1.

The present invention provides a method for determining the optimal viewing angle of display, input, or output devices with limited viewing, output and/or sensing angle characteristics. Referring to FIGS. 1 and 2, test pattern 10, including test elements 12 and 14 and background 16, is displayed on display screen 18 which is in communication with computing device 20. For illustrative purposes, display screen 18 is a conventional flat screen display of liquid crystal display (LCD) (analog or digital), electroluminescent or other technology. One skilled in the art will recognize that the present invention is not limited to flat screen monitors, but may be applied to other devices as well, including but not limited to display, input, and output technologies with similar viewing, output and/or sensing angle characteristics. Test elements may be implemented in the form of any convenient indicator, such as patches as illustrated in the figures shown herein.

As is illustrated in detail in FIG. 2, test pattern 10 is displayed on display screen 18 and includes one or more test elements 12 and 14 having levels of gray different from the gray shown in background 16. The test pattern 10 of the present invention may be initiated, i.e., brought to display screen 18, in a number of ways, including clicking on an icon shown on display screen 18. One skilled in the art will recognize that the particular manner test pattern 10 is initiated is not critical to the invention. Once initiated, viewer evaluates test pattern 10 to determine if display screen is 18 positioned at an optical viewing angle to the viewer. One skilled in the art will recognize that the present invention is not limited to the evaluation of gray or luminance differences. Rather, the optimal display angle can be similarly determined by utilizing combinations of colors as test elements and patterns and adjustment can be made according to color changes or color differences between patterns. For illustrative purposes, however, the present invention is described with respect to detecting the difference in the levels of gray between the test elements and background.

In particular, one set of test elements 12 has a luminance just below background 16 and the other set of test elements 14 has a luminance just above background 16. To determine the optimal viewing angle, a viewer evaluates test pattern 10 to determine the difference in gray levels between test elements 12 and 14 against background 16. The viewer then adjusts the position of display screen 18 until test elements 12 and 14 either blend in with background 16 or provides the largest contrast with background 16, as discussed in detail below. Although the present invention is described utilizing test elements 12 and 14 having different levels of gray, one skilled in the art will recognize that the present invention may be implemented with as few as one patch having a luminance different from background 16.

Figure 3:
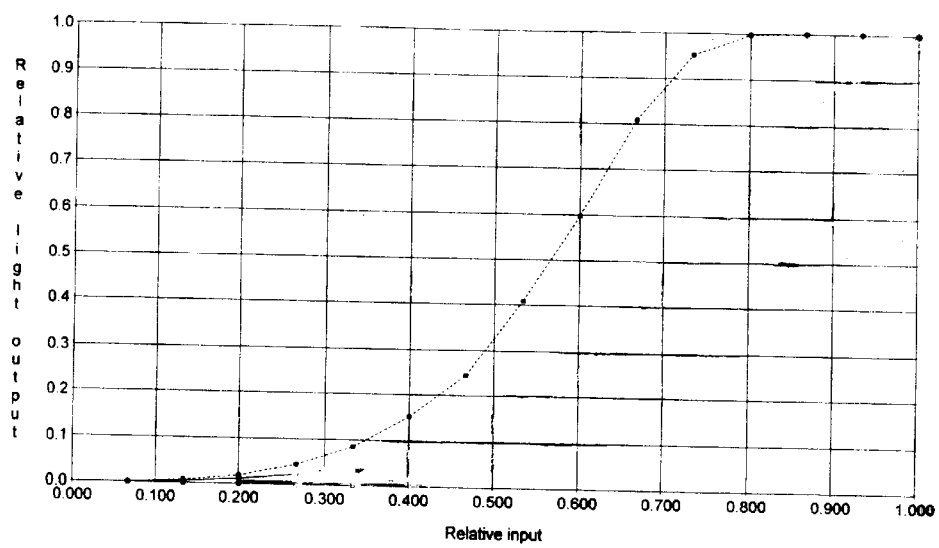
FIG. 3 is a graph of a tone reproduction curve for a flat panel display.

As noted above, in one aspect of the invention, the human visual system is used to detect differences in the color gray between elements 12 and 14 and background 16. Display screen 18 is tilted forwards or backwards relative to the user's viewing location until test elements 12 and 14 blend in or provide the largest contrast with background 16. This blending or contrast is dependent on various factors, including the shape of the tone reproduction curve for the particular display. An exemplary curve for a flat panel display is illustrated in FIG. 3. Where a very low luminance (for instance 8/255 intensity) or a very high luminance (for instance 247/255 intensity) background 16 is utilized, the optimal viewing angle is determined by adjusting display screen 18 until test elements 12 and 14 blend in with the background i.e., have the same luminance as the gray shading in background 16.

Where a medium luminance background 16 is utilized (for instance 128/255 intensity), the optimal viewing angle is determined when lower intensity test elements 12 (for instance 0/155 intensity) and higher intensity test elements 14 (for instance 255/255 intensity) appear to provide the largest contrast against background 16 i.e., have a luminance maximally different from the gray shading in the background 16. The display screen 18 needs to be adjusted to make test elements 12 and 14 most visible. Thus, for an optimal setting, the contrast between test elements 12 and 14 and background 16 is at a maximum. In accordance with the tone reproduction curve 20 shown in FIG. 3, what increases contrast at the mid-tones 22, decreases contrast in the darkest 24 and lightest areas 26.

Instructions on display screen 18 inform the viewer to physically manipulate the viewing angle of the screen, either horizontally, vertically or both, until the background 16 looks uniform. This corresponds to the optimal relative position between user's eyes and flat panel surface. For example, in operation, background 16 is made of an 8/255 gray. Elements are made of either 0/255 gray or 16/255 gray. One skilled in the art will recognize that these values have been chosen to work on all color resolution systems, including but not limited to 8, 15/16 and 24/32 bit systems. Moreover, instead of adjusting the angle of the display screen 18, the viewer could adjust his or her viewing angle while leaving the display screen 18 stationary, use control mechanisms to move with display screen 18, use control mechanisms to adjust properties of the display that affect viewing angle or a combination of any of the above.

Figure 4:
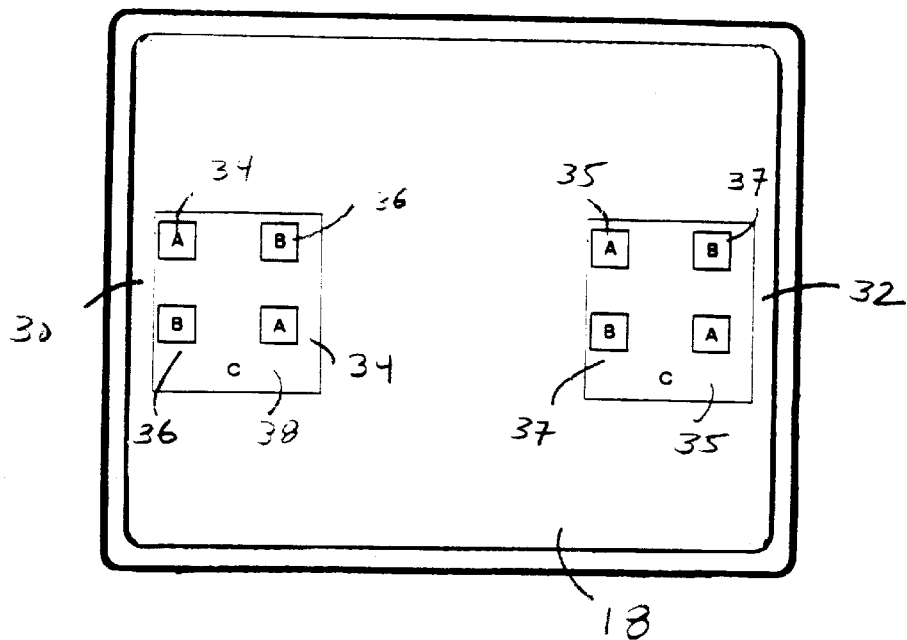
FIG. 4 is a depiction of a test pattern for determining the optimal viewing angle of a display using a plurality of backgrounds in accordance an alternative embodiment of the invention.

Referring to FIG. 4, in accordance with another embodiment of the invention, the present invention may also be implemented using two or more test patterns 30 and 32 simultaneously in different portions of display screen 18. In this configuration, the optimal viewing angle is determined by adjusting display screen 18 until test elements 34 and 36 in each test pattern 30 and 32 blend in or maximally contrasts with its respective background 38 and 40. As noted above, whether the test elements 34 and 36 blend in or contrast with the background 38 and 40 is dependent on the shape of the tone reproduction curve 20 such as that shown in FIG. 3 for the particular display screen 18. For example, as shown in FIG. 4, test pattern 30 includes elements 34 and 36 displayed on low luminance background 38 while test pattern 32, disposed at the opposite end of display screen 18, includes elements 35 and 37 displayed on high luminance background 40. Instructions on display screen 18 inform the viewer to tilt the screen 18, either horizontally, vertically or both, until the display screen 18 looks uniform (i.e. elements 34, 35, 36 and 37 disappear) or until elements 34, 35, 36 and 37 provide maximum contrast against backgrounds 38 and 40.

Figure 5:
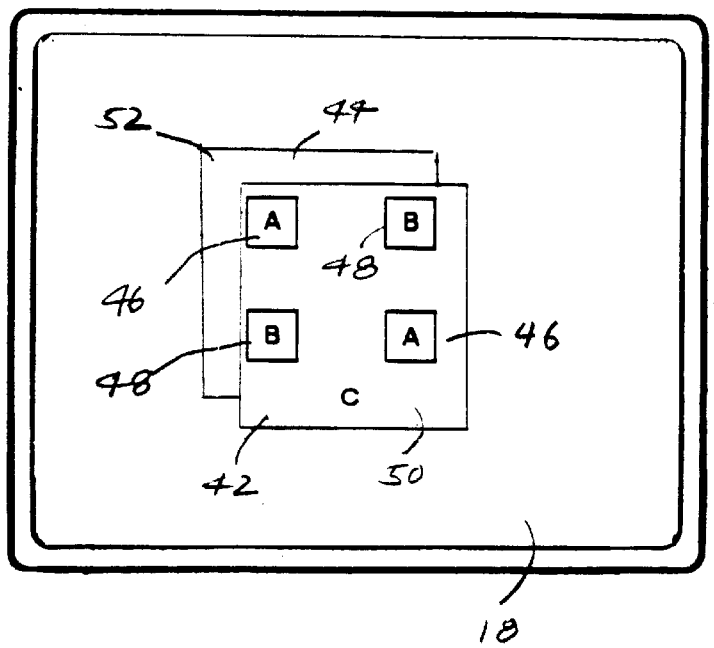
FIG. 5 is a depiction of a test pattern for determining the optimal viewing angle of a display by sequentially displaying the test patterns in succession in accordance with another alternative embodiment of the invention.

Referring to FIG. 5, in another embodiment of the invention, test patterns 42 and 44 for determining the optimal viewing angle of a flat display 18 are sequentially displayed in succession. In this configuration, the optimal viewing angle is determined by adjusting display screen 18 until test elements 46 and 48 in each test pattern 42 and 44 blend in or maximally contrasts with its respective background 50 and 52 after each test pattern 42 and 44 is displayed. The test patterns 42 and 44 sequentially displayed may be the same or different patterns. As noted above, whether the test elements 46 and 48 blend in or contrast with the respective background 50 and 52 is dependent upon the shape of the tone reproduction curve 20 as shown in FIG. 3 for the particular display screen 18. Instructions on display screen 18 inform the viewer to tilt the screen 18, either horizontally, vertically or both, until the display screen 18 looks uniform or the elements provide maximum contrast against their respective background 50 and 52.

The present invention may be performed with or without human involvement, and could be performed either locally or via a remote device. Although the preferred embodiment implements the test patterns as a method to adjust the viewing, sensing, and/or display angle of the device, these patterns could be just as easily used as part of a method to pre-process and/or otherwise alter images to be displayed on the device or to alter the display itself so that these images display, capture, and/or print correctly after taking the tilt angle characteristics into consideration. In the case where sensing of luminance and/or contrast of test elements is not limited to the human visual system, software implemented in a processor associated with the display screen can be used to detect the differences between the test elements and background and use such information to pre-process and/or otherwise alter images to be displayed on the device or to alter the display itself so that these images display, capture, and/or print correctly after taking the tilt angle characteristics into consideration.

Figure 6:
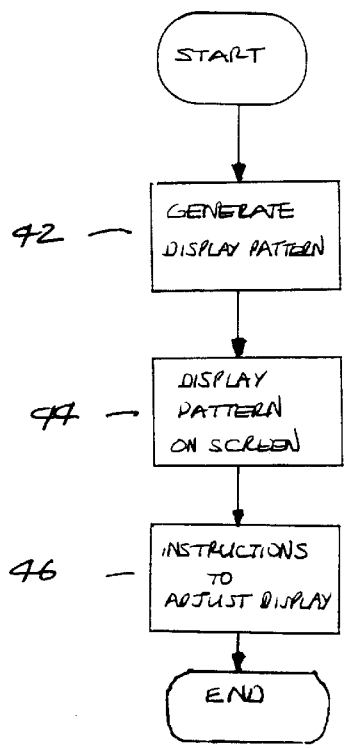
FIG. 6 is a flow chart illustrating a method for determining the optimal viewing angle of a display in accordance with the preferred embodiment of the invention.

The present invention may be implemented as a computer program associated with a processor in communication with display screen. Referring to FIG. 6, a flow chart 40 of the computer program for determining the optimal viewing angle of a display screen in accordance with the preferred embodiment of the invention is illustrated. In this particular embodiment, the optimal display angle for viewing the display screen is when the viewer's line of vision is perpendicular to the surface of the display screen, i.e. at a 90 degree angle. In other words, the viewer's line of vision is normal to the surface of the display screen. In such case, the present invention initially generates a test pattern which is displayed on display screen as described earlier (step 42). The test pattern includes at least one indicator and a background, where the appearance of the indicator is different from the appearance of the background. The present invention then displays the test pattern on the display screen for viewing by the user (step 44). The present invention then generates instructions to the user to adjust the display until the indicators and background indicate that the display is at its optimal viewing angle (step 46). As noted above, the optimal viewing angle may be achieved when the appearance of the indicators blend in with the appearance of the background after manipulation of the display. Depending on the particular pattern, the optimal viewing angle may also be achieved when the appearance of the indicator is maximally different from the appearance of the background after manipulation of the display. This manipulation as described above may be accomplished by physical rotation of the screen by the user or other means such as user controls and so forth.

In accordance with an advantage of the present invention, the apparatus and method provides the ability to adjust the viewing, sensing, and/or display angle even where the optimal viewing angle of the display screen is not perpendicular (i.e. normal or at a 90 degree angle) to a viewer's line of vision. For example, where a particular display screen has an optimal viewing of 95 degrees, a user using the present invention can determine the amount of rotation required to adjust the screen such that it is perpendicular (i.e. at a 90 degree angle) to a user's line of vision using the method outlined in the flowchart shown in FIG. 6. The user can then consult manufacturer information regarding the particular display screen to determine the optimal viewing angle for the display and then calculate the difference between the screen's optimal viewing angle and 90 degrees. The user can then adjust the screen from the normal configuration (i.e. perpendicular angle) to the optimal viewing angle. In the above example, the user would adjust the screen an additional 5 degrees from the normal angle (90 degrees) to obtain the optimal viewing angle for the user's particular display (95 degrees). In accordance with another embodiment of the invention, the optimal display angle of known display screens can be preprogrammed in and used by the software to determine the additional degree the display screen needs to be rotated from its normal configuration.

Figure 7:
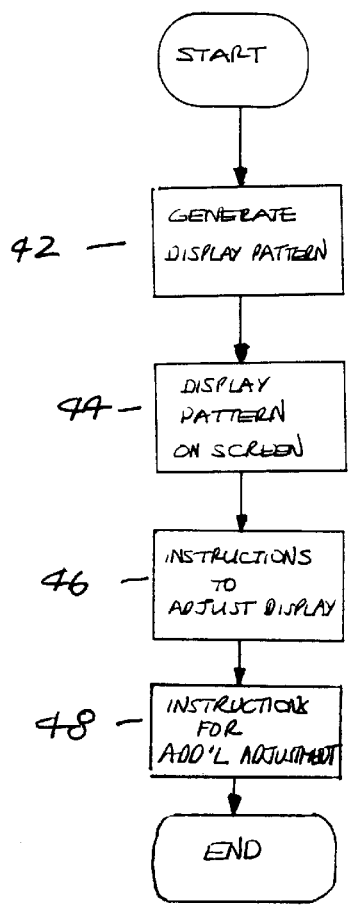
FIG. 7 is a flow chart illustrating a method for determining the optimal viewing angle of a display in accordance with an alternative embodiment of the invention.

In particular, FIG. 7 is a flow chart 47 of the computer program for determining the optimal viewing angle of a display screen in accordance with the an alternative embodiment of the invention where the optimal viewing angle of the display screen is not 90 degrees. In such case, steps 42, 44 and 46 shown in FIG. 6 are followed initially to rotate the display screen to a 90 angle (i.e. the angle between the user's line of sight and the surface of the display screen is 90 degrees). In step 48, instructions are generated for a user to adjust the display an additional amount from the 90 degree viewing angle to achieve the optimal viewing angle for the display. The instructions may do this in a number of ways, including instructing the user to consult information regarding the particular optimal viewing angle of the particular display in question. The difference between the optimal viewing angle and the 90 degree viewing angle is the additional amount the displayed must be rotated.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following changes.

What is claimed is:

1. An apparatus for determining a predetermined viewing angle of a display, comprising:

logic for generating a test pattern including at least one indicator and a background, wherein the appearance of said indicator is different from the appearance of said background and said difference in appearance between said indicator and said background at various viewing angles indicates whether said predetermined viewing angle has been determined; and logic for generating instructions to a user to adjust said display until said appearance of said indicator blends in with the appearance of said background after manipulation of said display to achieve said predetermined viewing angle.

2. The apparatus claimed in claim 1, further comprising logic for generating instructions to a user to adjust said display an additional amount from said predetermined viewing angle to achieve an optimal viewing angle.

3. The apparatus claimed in claim 2, wherein said logic for generating instructions to a user to adjust said display an additional amount from said predetermined viewing angle to achieve an optimal viewing angle further comprises:

logic for generating instructions to a user to adjust said display an additional amount from said predetermined viewing angle in accordance with said display's optimal viewing angle.

4. The apparatus claimed in claim 3, wherein said predetermined viewing angle is 90 degrees.

5. The apparatus claimed in claim 1, wherein said logic comprises:

logic for determining said predetermined viewing angle by generating instructions to said user to manipulate said display until the appearance of said indicator blends in with the appearance of said background.

6. The apparatus claimed in claim 5, further comprising logic for determining a difference between said predetermined viewing angle and an optimal viewing angle.

7. The apparatus claimed in claim 6, wherein said logic comprises:

logic for generating instructions to said user to manipulate said display in accordance with said difference to achieve said optimal viewing angle.

8. The apparatus claimed in claim 1, wherein said logic comprises:

logic for determining said predetermined viewing angle by generating instructions to said user to manipulate said display until the appearance of said indicator is maximally different from the appearance of said background.

9. The apparatus claimed in claim 8, further comprising logic for determining a difference between said predetermined viewing angle and an optimal viewing angle.

10. The apparatus claimed in claim 9, wherein said logic comprises:
   logic for generating instructions to said user to manipulate said display in accordance with said difference to achieve said optimal viewing angle.

11. An apparatus for determining a predetermined viewing angle of a display, comprising:
   logic for generating a test pattern including at least one indicator and a background, wherein the appearance of said indicator is different from the appearance of said background and said difference in appearance between said indicator and said background at various viewing angles indicates whether said predetermined viewing angle has been determined; and
   logic for generating instructions to a user to adjust said display until said appearance of said indicator is maximally different from said appearance of said background.

12. The apparatus claimed in claim 11, wherein said logic for generating instructions comprises:
   logic for generating instructions to said user to adjust said display an additional amount from said predetermined viewing angle to achieve an optimal viewing angle.

13. The apparatus claimed in claim 12, wherein said logic for generating instructions to said user to adjust said display an additional amount from said predetermined viewing angle to achieve an optimal viewing angle further comprises:
   logic for generating instructions to said user to adjust said display an additional amount from said predetermined viewing angle in accordance with said display's optimal viewing angle.

14. The apparatus claimed in claim 13, wherein said predetermined viewing angle is 90 degrees.

15. An apparatus for determining a predetermined viewing angle of a display, comprising:
   logic for generating a test pattern including at least one indicator and a background, wherein the appearance of said indicator is different from the appearance of said background and said difference in appearance between said indicator and said background at various viewing angles indicates whether said predetermined viewing angle has been determined;
   logic for generating a first set of indicators having a luminance below the luminance of said background; and
   logic for generating a second set of indicators having a luminance above the luminance of said background.

16. A method for determining a predetermined viewing angle of a display, comprising:
   providing a computer program for generating a test pattern including at least one indicator and a background, wherein the appearance of said indicator is different from the appearance of said background and the difference in appearance between said indicator and said background at various viewing angles indicates whether said predetermined viewing angle has been determined; and
   generating instructions to a user to adjust said display until said appearance of said indicator blends in with said appearance of said background after manipulation of said display to achieve said predetermined viewing angle.

17. The method claimed in claim 16, further comprising generating instructions to a user to adjust said display an additional amount from said predetermined viewing angle to achieve an optimal viewing angle.

18. The method claimed in claim 17, wherein generating instructions to a user to adjust said display an additional amount from said predetermined viewing angle to achieve an optimal viewing angle further comprises:
   generating instructions to a user to adjust said display an additional amount from said predetermined viewing angle in accordance with said display's optimal viewing angle.

19. The method claimed in claim 18, wherein said predetermined viewing angle is 90 degrees.

20. A method for determining a predetermined viewing angle of a display, comprising:
   providing a computer program for generating a test pattern including at least one indicator and a background, wherein the appearance of said indicator is different from the appearance of said background and the difference in appearance between said indicator and said background at various viewing angles indicates whether said predetermined viewing angle has been determined; and
   generating instructions to a user to adjust said display until said appearance of said indicator is maximally different from said appearance of said background.

21. The method claimed in claim 20, further comprising generating instructions to a user to adjust said display an additional amount from said predetermined viewing angle to achieve an optimal viewing angle.

22. The method claimed in claim 21, wherein generating instructions to a user to adjust said display an additional amount from said predetermined viewing angle to achieve an optimal viewing angle further comprises:
   generating instructions to a user to adjust said display an additional amount from said predetermined viewing angle in accordance with said display's optimal viewing angle.

23. The method claimed in claim 22, wherein said predetermined viewing angle is 90 degrees.

24. The method claimed in claim 20, wherein generating instructions to said user comprises:
   generating instructions to said user to manipulate said display until the appearance of said indicator blends in with the appearance of said background to determine said predetermined viewing angle.

25. The method claimed in claim 24, further comprising determining a difference between said predetermined viewing angle and an optimal viewing angle.

26. The method claimed in claim 25, wherein generating instructions to said user comprises:
   generating instructions to said user to manipulate said display in accordance with said difference to achieve said optimal viewing angle.

27. A method for determining a predetermined viewing angle of a display, comprising:
   providing a computer program for generating a test pattern including at least one indicator and a background, wherein the appearance of said indicator is different from the appearance of said background and the difference in appearance between said indicator and said background at various viewing angles indicates whether said predetermined viewing angle has been determined;

generating a first set of indicators having a luminance below the luminance of said background; and generating a second set of indicators having a luminance above the luminance of said background.

28. A method for determining a predetermined viewing angle of a display, comprising:

provided a computer program for generating a test pattern including at least one indicator and a background, wherein the appearance of said indicator is different from the appearance of said background and the difference in appearance between said indicator and said background at various viewing angles indicates whether said predetermined viewing angle has been determined; and generating instructions to said user to manipulate said display until the appearance of said indicator is maximally different from appearance of said background to determine said predetermined viewing angle.

29. The method claimed in claim 28, further comprising determining a difference between said predetermined viewing angle and an optimal viewing angle.

30. The method claimed in claim 29, wherein generating instructions to said user comprises:

generating instructions to said user to manipulate said display in accordance with said difference to achieve said optimal viewing angle.

* * * * *